United States Patent
Cottrell et al.

(10) Patent No.: US 12,016,487 B2
(45) Date of Patent: Jun. 25, 2024

(54) METHOD AND SYSTEM FOR FOODSTUFF IDENTIFICATION

(71) Applicant: June Life, LLC, San Francisco, CA (US)

(72) Inventors: Robert Cottrell, San Francisco, CA (US); Jithendra Paruchuri, San Francisco, CA (US); Nikhil Bhogal, San Francisco, CA (US); Nishit Kumar, San Francisco, CA (US); Wiley Wang, San Francisco, CA (US)

(73) Assignee: June Life, LLC, San Francisco, CA (US)

( * ) Notice: Subject to any disclaimer, the term of this patent is extended or adjusted under 35 U.S.C. 154(b) by 38 days.

(21) Appl. No.: 17/376,535

(22) Filed: Jul. 15, 2021

(65) Prior Publication Data
US 2022/0015572 A1    Jan. 20, 2022

Related U.S. Application Data

(60) Provisional application No. 63/052,079, filed on Jul. 15, 2020.

(51) Int. Cl.
| | |
|---|---|
| *A47J 36/32* | (2006.01) |
| *A23L 5/10* | (2016.01) |
| *A47J 37/06* | (2006.01) |
| *F24C 15/04* | (2006.01) |
| *G05B 13/02* | (2006.01) |
| *G06F 18/21* | (2023.01) |

(Continued)

(52) U.S. Cl.
CPC ............. *A47J 36/32* (2013.01); *A23L 5/15* (2016.08); *A47J 37/0664* (2013.01); *F24C 15/04* (2013.01); *G05B 13/027* (2013.01); *G06F 18/21* (2023.01); *G06F 18/2431* (2023.01); *G06T 7/20* (2013.01); *G06V 20/00* (2022.01); *H04N 13/204* (2018.05); *G06T 2207/20084* (2013.01); *G06T 2207/30241* (2013.01); *G06V 20/68* (2022.01)

(58) Field of Classification Search
CPC ............ G06T 7/20–292; G06T 2207/30241
See application file for complete search history.

(56) References Cited

U.S. PATENT DOCUMENTS

| | | |
|---|---|---|
| 2010/0238262 A1 | 9/2010 | Kurtz et al. |
| 2016/0210536 A1* | 7/2016 | Cho ................ G16H 30/40 |

(Continued)

FOREIGN PATENT DOCUMENTS

| | | | |
|---|---|---|---|
| DE | 202011002570 U1 * | 6/2012 | ............ F24C 7/085 |
| DE | 102013102293 A1 * | 9/2014 | ............ F24C 15/16 |

(Continued)

*Primary Examiner* — John J Norton
(74) *Attorney, Agent, or Firm* — Banner & Witcoff, Ltd.

(57) ABSTRACT

A method for foodstuff identification can include: detecting a trigger event; sampling a measurement set; optionally determining candidate measurements for subsequent analysis based on the measurement set; optionally determining a set of food parameter values from the measurements; optionally selecting a food parameter value for use; determining a cooking instruction based on the food parameter value; automatically operating the appliance based on the cooking instructions; optionally determining a foodstuff trajectory relative to the cook cavity; optionally training one or more modules; and/or any other suitable elements.

9 Claims, 8 Drawing Sheets

(51) Int. Cl.
*G06F 18/2431* (2023.01)
*G06T 7/20* (2017.01)
*G06V 20/00* (2022.01)
*G06V 20/68* (2022.01)
*H04N 13/204* (2018.01)

(56) References Cited

U.S. PATENT DOCUMENTS

| | | | | |
|---|---|---|---|---|
| 2016/0283822 | A1 | 9/2016 | Imai et al. | |
| 2016/0327281 | A1 | 11/2016 | Bhogal et al. | |
| 2018/0324908 | A1* | 11/2018 | Denker | H04N 7/188 |
| 2021/0228022 | A1* | 7/2021 | Liu | F24C 7/081 |

FOREIGN PATENT DOCUMENTS

| | | | | |
|---|---|---|---|---|
| DE | 102013110642 A1 * | 3/2015 | ............. | F24C 7/085 |
| EP | 1767865 A2 | 3/2007 | | |
| EP | 3067828 A1 * | 9/2016 | ............. | F24C 7/085 |
| WO | 2014086486 A2 | 6/2014 | | |
| WO | 2020077501 A1 | 4/2020 | | |

* cited by examiner

METHOD AND SYSTEM FOR FOODSTUFF IDENTIFICATION

CROSS-REFERENCE TO RELATED APPLICATIONS

This application claims the benefit of U.S. Provisional Application No. 63/052,079 filed 15 Jul. 2020, which is incorporated in its entirety by this reference.

TECHNICAL FIELD

This invention relates generally to the field of appliances, and more specifically to a new and useful method for foodstuff identification.

BACKGROUND

Automated appliances, such as smart ovens, can rely on computer-vision-based techniques to automatically recognize foodstuff to be cooked. While some solutions include cameras in-situ (e.g., located within the cooking cavity) for sampling source images, there are other appliances that are required to operate at very high temperature (e.g., commercial grade ovens that can cook faster than noncommercial grade ovens). In such cases, the high temperature renders the in-situ arrangement infeasible due to prohibitive cost and technical challenges for the heat shield necessary to protect the camera electronics.

Thus, there is a need in the field of appliance control to create a new and useful method and system for foodstuff identification. This invention provides such a new and useful method and system.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
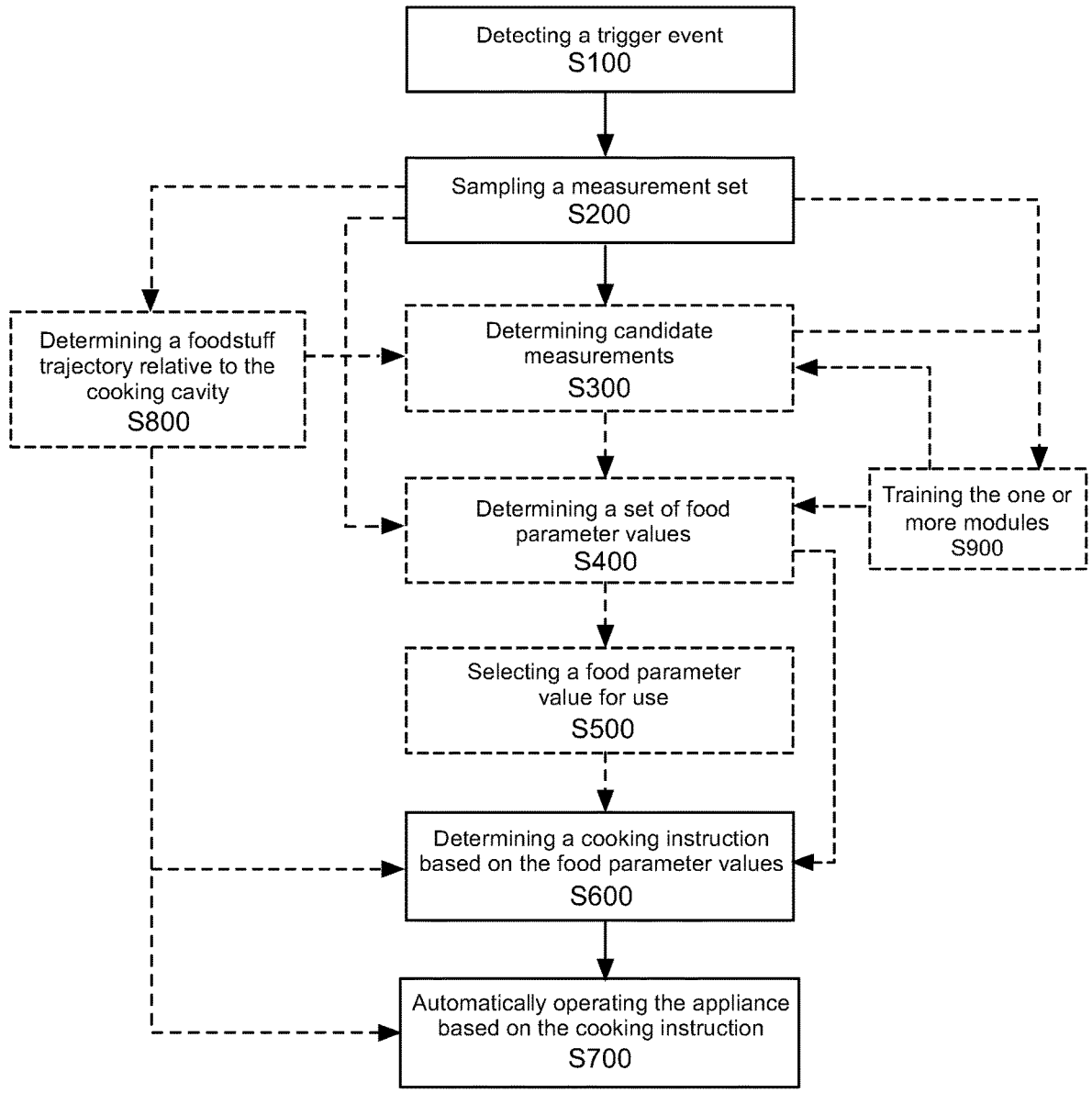
FIG. 1 is a schematic representation of the method.
Figure 2:
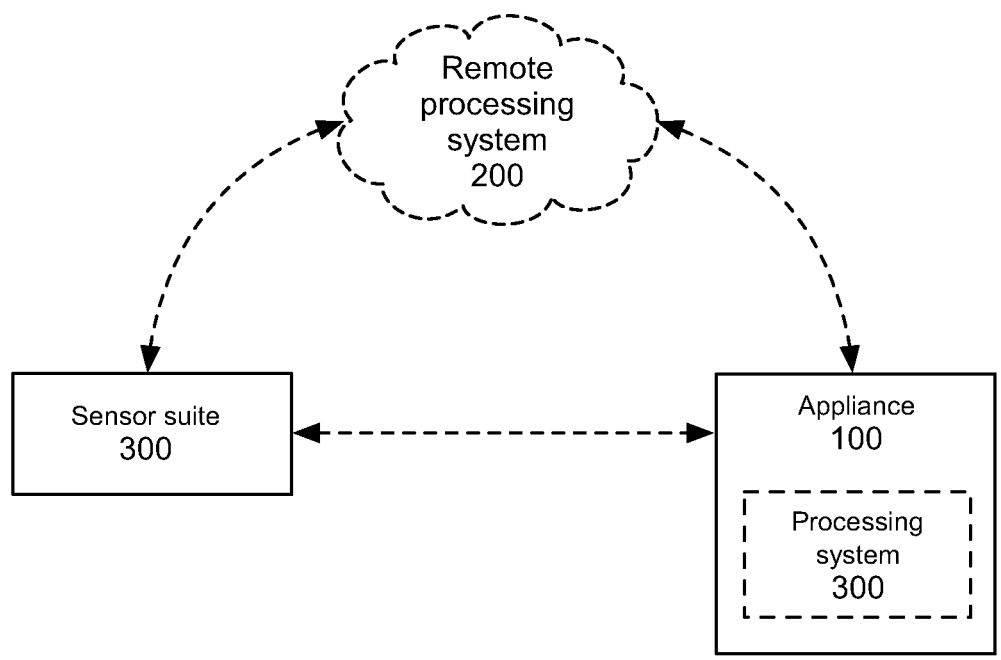
FIG. 2 is a schematic representation of the system.

As shown in FIG. 1, the method for foodstuff identification preferably includes: detecting a trigger event S100; sampling a measurement set S200; optionally determining candidate measurements S300; optionally determining a set of food parameter values from the measurements S400; optionally selecting a food parameter value for use S500; determining a cooking instruction based on the food parameter value S600; automatically operating the appliance based on the cooking instruction S700; optionally determining a foodstuff trajectory relative to the cook cavity S800; optionally training one or more modules S900; and/or any other suitable elements. As shown in FIG. 2, the system for foodstuff identification can include: one or more appliances 100, one or more processing systems 200, a sensor suite 300, and/or any other suitable components.

2. Examples

Figure 6:
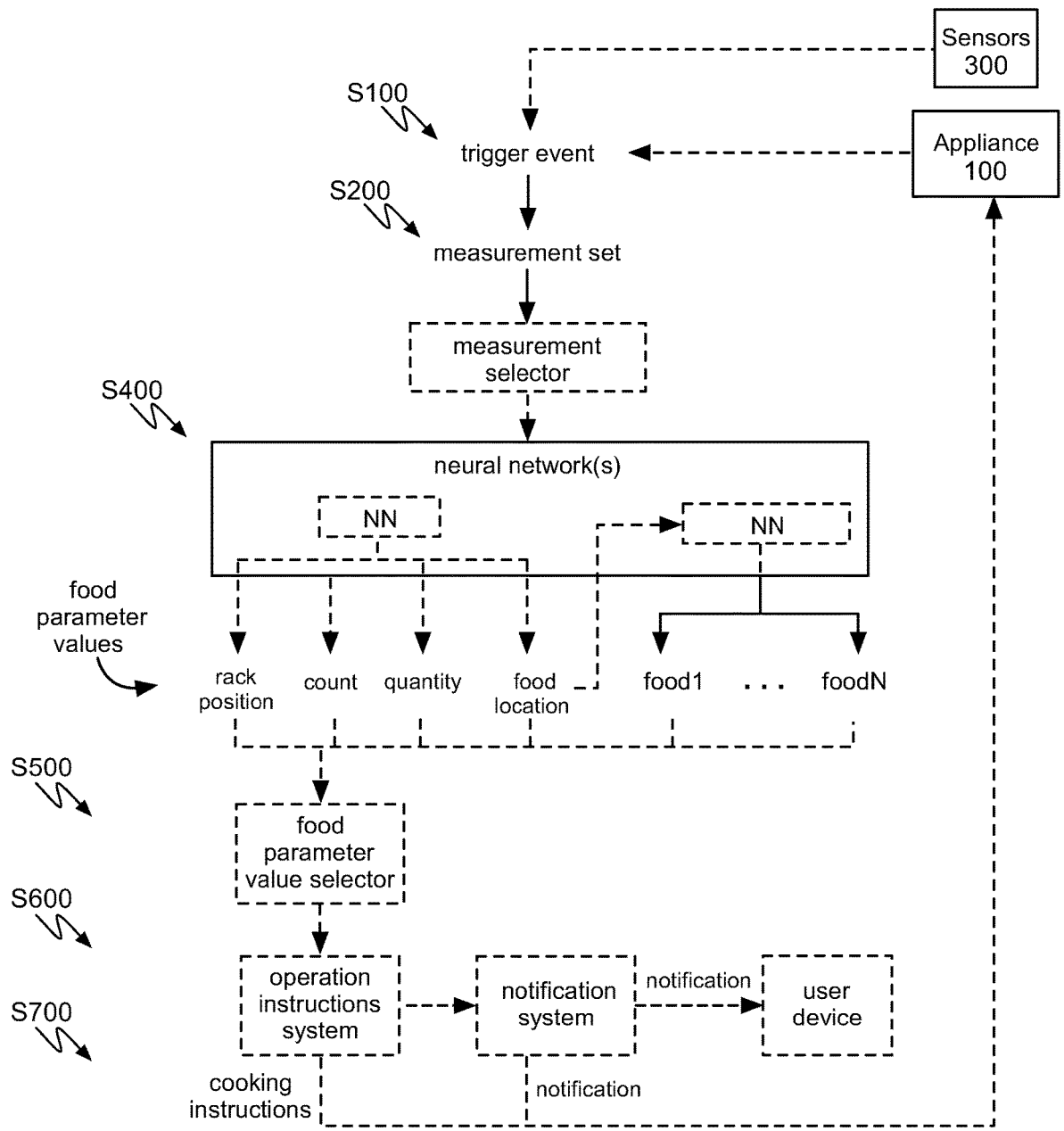
FIG. 6-7 are schematic representations of examples of the method and system.

In a first example, the method can include: at an appliance, detecting a door opening event; capturing a series of frames (e.g., images) at the cooking cavity threshold (e.g., using an outward facing camera system and recording frames while foodstuff is being inserted into a cook cavity of the appliance); selecting a set of frames from the series based on frame parameters (e.g., clarity, blur, amount of foodstuff or tray visible in the image, amount of foodstuff or tray occlusion by a hand or tool, exposure, etc.); determining one or more food parameter values for the foodstuff based on the frames (e.g., class labels, wherein the class labels can represent foodstuff identifiers, foodstuff counts, foodstuff quantity, foodstuff location within the cavity, rack height, etc.); and automatically determining cook programs based on the one or more food parameter values (e.g., based on the food identifier, rack height, food location, etc.), wherein the appliance is operated based on the cook program (e.g., executes the cook program). In a specific example, a cooking instruction for the appliance can be determined based on the specific permutation of food types, counts, quantities, respective positions, and/or other food parameter values (e.g., of the method is depicted in FIG. 6) for the foodstuff instance.

3. Benefits

The method can confer several benefits over conventional systems.

First, by automating food identification and control, automated appliances, such as smart ovens or smart grills, can be designed to reduce manual control, cognitive overload on the operator, and operator mistakes. For example, the method and system can automatically determine cooking instructions in real time based on foodstuff identification as the food is inserted into the appliance.

Second, the method and system can identify food even when it is placed on racks of an appliance that result in occlusions (e.g., bottom or middle racks that would otherwise have been obscured by the top rack) for automated cooking by sampling images at the cooking cavity threshold (e.g., instead of the cooking cavity interior). This camera arrangement can further enable automatic food identification with cameras (e.g., that include inexpensive heat-shields) to be integrated into high-heat cooking environments (e.g., industrial ovens, grills, etc.) and/or low-visibility environments (e.g., smokers) without requiring additional expensive modifications (e.g., high heat enclosures, etc.).

Third, the method and system can enable high accuracy on recognition tasks, even when the object is in motion (e.g., being inserted into a cooking cavity). High accuracy can be achieved by: storing classifications and automatically selecting a cooking instruction after M (sequential or non-sequential) classifications out of N classifications agree; by determining one or more best frames based on the image contents (e.g., foodstuff, cooking accessory, cooking tool, etc.) and/or confidence levels associated with the frames; or otherwise achieved. In a first example, high accuracy can be achieved by determining a first frame that achieves a threshold confidence and using the time associated with the frame to "search" for other frames close in time (e.g., previous time-steps, future time-steps, within a predetermined time window, etc.) to the first frame and process the other frames using the method.

Fourth, the method and system can enable rapid recognition of foodstuff. In variants, the foodstuff is identified between the time the appliance door is opened and closed (or within a predetermined period of time thereafter, such as 1 ns, 10 ms, a range therein, etc.). In variants, the rapid recognition of foodstuff can be enabled by: a single neural network, small number of items to recognize (e.g., just items on the menu), and/or otherwise enabled.

However, the method and system can confer any other suitable benefits.

4. System

The method is preferably performed using the system including: one or more appliances 100, one or more processing systems 200, a sensor suite 300, and/or any other suitable elements. However, the method can be performed with any other suitable system.

Figure 3:
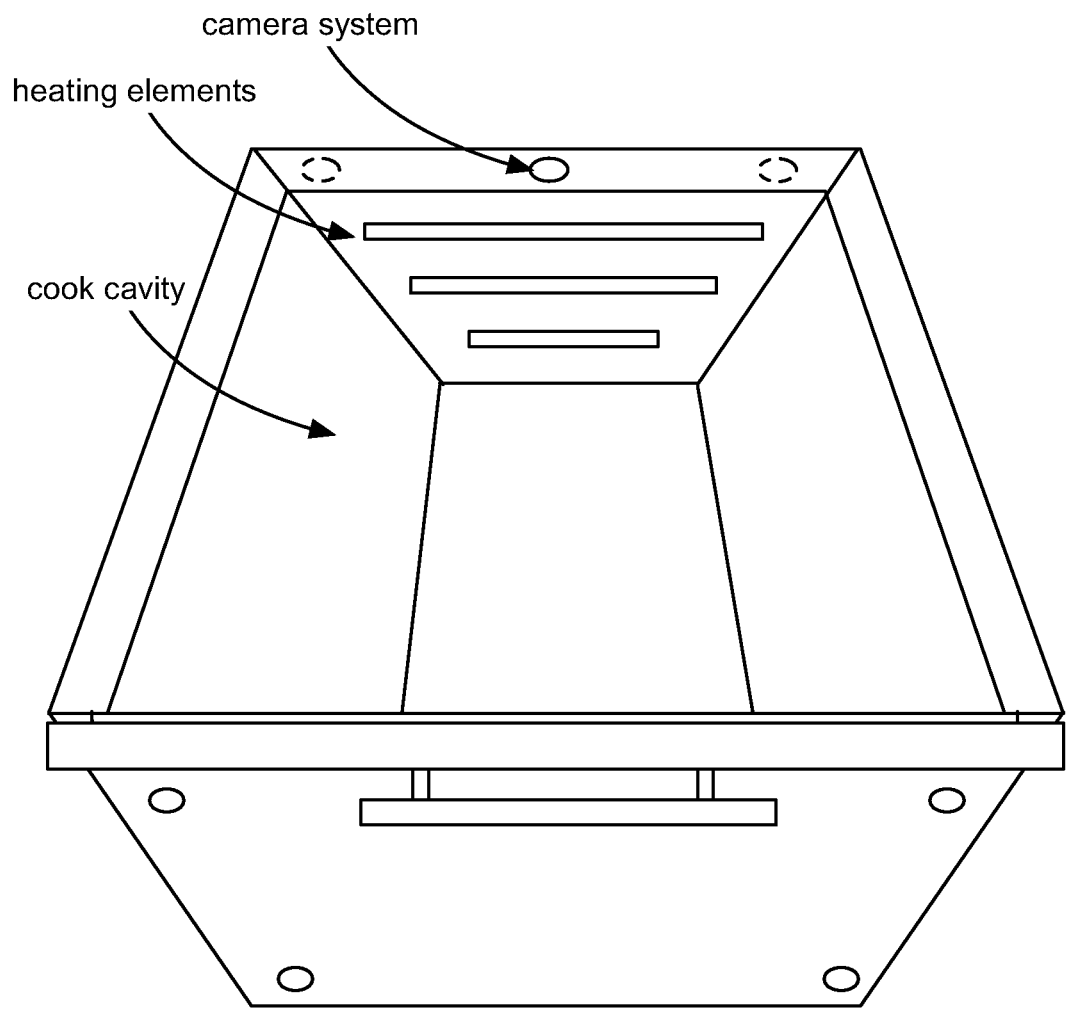
FIG. 3 depicts a variant of the system.
Figure 4:
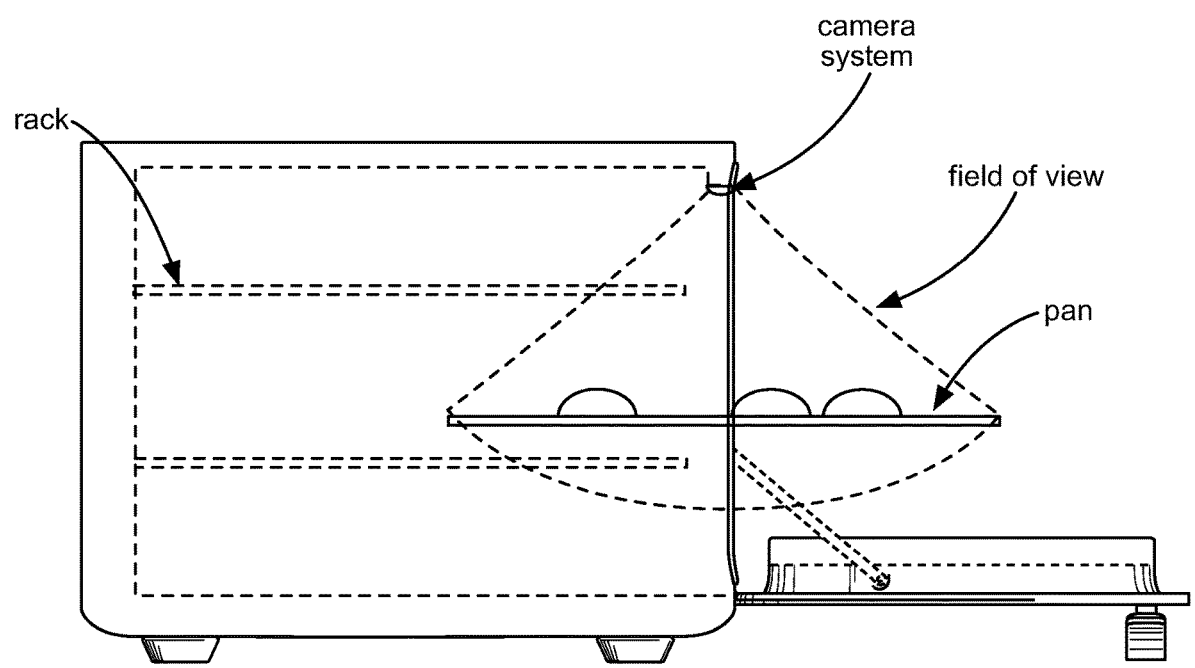
FIG. 4 depicts a variant of the system.

The appliance can include: a housing, which can define a cooking cavity with an opening, a door or lid (e.g., configured to seal the cooking cavity), a doorframe, and/or any other suitable component; one or more racks located within the cooking cavity; and one or more heating elements located within the cooking cavity (e.g., left, right, bottom, top, etc.). The heating elements can be individually or batch controllable. The appliance can be a commercial oven, an industrial oven, a conventional oven, a convection oven, a grill, a smoker, a pizza oven, an appliance operable above a temperature threshold (e.g., 500° F., 450° F., etc.), and/or any other suitable appliance. Variants of the appliance are depicted in FIGS. 3 and 4. Specific examples of an appliance are described in U.S. application Ser. No. 15/147,597 filed 5 May 2016 and U.S. application Ser. No. 16/380,894 filed 10 Apr. 2019, each of which is incorporated herein in its entirety by this reference. However, the appliance can be otherwise configured.

The sensors of the sensor suite can be external to the appliance, integrated into the appliance (e.g., into the doorframe, into the cavity top, side, or bottom, etc.), and/or otherwise positioned relative to the appliance. The sensor suite can include: one or more camera systems, motion sensors, IMU sensors, depth sensors (e.g., projected light, time of flight, radar, etc.) temperature sensors, audio sensors, door open/close sensors, weight sensors, and/or any other suitable sensor.

The one or more camera systems can include CCD cameras, infrared cameras, stereo cameras, video cameras, event cameras, and/or any other suitable camera. The cameras can be used with one or more lights (e.g., LEDs, filament lamps, discharge lamps, fluorescent lamps, etc.), which can be positioned next to the cameras, within a predetermined distance from the camera system, and/or otherwise positioned relative to the camera system. The camera system can be externally or internally located relative to the cooking cavity. The camera system can be mounted to the appliance, to an arm proximal the appliance, to a ceiling above an appliance, and/or otherwise mounted.

The camera system can be built into the appliance (e.g., integrated into the appliance), removably mountable to the appliance, and/or otherwise mounted to the appliance. The camera system can be mounted: to the doorframe (e.g., top, bottom, left, right, interior, exterior, etc.), to the cook cavity threshold, within the cook cavity (e.g., top, bottom, left, right, back, a corner, front, back, middle, etc.), to the door or lid (e.g., top, bottom, right, left, or center of the door or lid's edge, bezel, or side; top, bottom, right, left, center, or interior of the door or lid face; inner face; outer face; etc.), and/or to any other suitable portion of the appliance.

The camera system can be blocked when the cooking cavity is sealed (e.g., wherein the camera lens and/or sensor is covered when the door or lid is closed), have line of sight to the cooking cavity when the cooking cavity is sealed, or be otherwise obscured or unobscured (or have a blocked or unblocked line of sight into the cooking cavity) when the cooking cavity is sealed.

The camera system can be oriented: downward, upward, to the side, at an angle, inward, outward, and/or in any other suitable direction. The camera system's FOV (e.g., of the camera, the collective FOV from the camera system's cameras, etc.) can: encompass at least a portion of the cook cavity (e.g., while the door or lid is open; such as the lower rack, the upper rack, etc.), exclude the cook cavity, encompass a portion of the cook cavity exterior (e.g., the door threshold, a region in front of the door threshold, etc.), exclude the cook cavity exterior, and/or be otherwise arranged.

In a first variation, the camera system can be mounted to an appliance component defining a cook cavity threshold (e.g., doorframe, lid, etc.). The camera can be mounted to one or more surfaces of the doorframe (e.g., header, jamb, side, top, bottom, etc.). The camera can be positioned along one or more locations of the doorframe surface, such as the center, near the corner, between the center and the corner, along a side, and/or in any other suitable position. The camera can be oriented parallel to, offset from, or at an angle to the cooking cavity opening or threshold (e.g., angled inward, angled outward, any tilt between 0-90 degrees or 0-270 degrees, etc.).

In a first example, the camera system is mounted to the top of a doorframe and the camera system is downward facing (e.g., facing toward the cooking cavity threshold, wherein the centerline of the camera system is parallel to the gravity vector; angled outward, wherein the centerline of the camera system is angled outward relative to the cavity opening plane; angled inward, wherein the centerline of the camera system is angled inward relative to the cavity opening plane; etc.).

In a second example, the camera system is mounted to a top surface of an appliance external the cook cavity. In this example, the camera system can be angled outward relative to the cook cavity (e.g., facing away from the cook cavity) or otherwise oriented.

In a third example, the camera system is mounted to the bottom edge of a grill hood (e.g., lid, cover, etc.) or the bottom portion of the grill hood interior. In this example, the camera system can sample images when the grill hood cover is fully open (e.g., as determined from camera or frame stability, as determined by a hood sensor, etc.), or sample the images at any other suitable time.

In a fourth example, the appliance does not include an in-cavity camera (e.g., in-situ camera). In this example, the appliance can include or exclude an exterior camera (e.g., arranged in a door, in a doorframe, etc.).

Additionally or alternatively, the camera system can be located in the cavity, in the door, outside of the appliance housing, and/or in any other suitable location.

The camera system can be dynamically positioned or statically positioned.

The camera system can include a wide-angle field of view (e.g., encompass 80-100% of a pan in a single frame; 90° or larger), a narrow field of view, or any other suitable field of view.

The camera system can include: a monocular camera, a stereocamera, more than two cameras, and/or any other suitable number of cameras. When the camera system includes multiple cameras, the cameras can be: aligned along a major appliance component axis (e.g., lateral lid edge axis, lateral doorframe axis, etc.), minor appliance component axis (e.g., longitudinal lid edge axis, longitudinal doorframe axis, etc.), offset from said axes, and/or otherwise arranged. The camera system can sample images in: the visible range, UV, IR, multispectral, hyperspectral, and/or any other suitable wavelength.

In a first example, the camera system can include a single camera.

In a second example, the camera system can include a stereo camera pair. The stereo camera pair can be mounted on the top of the doorframe looking down, on the left and/or right side of the doorframe and/or otherwise located relative to the doorframe. However, the camera system can be otherwise configured.

However, the sensor suite can be otherwise configured.

The processing system can be local to the appliance and/or remote. The processing system can be distributed and/or not distributed. The processing system can be configured to execute the method (or a subset thereof); different processors can execute one or more modules (e.g., one or more algorithms, search techniques, etc.); and/or be otherwise configured. The processing system can include one or more non-volatile computing elements (e.g., processors, memory, etc.), one or more non-volatile computing elements, and/or any other suitable computing elements. However, the processing system can be otherwise configured.

The system can include one or more modules, which can include one or more: classifiers, object detectors, object tracking models, segmentation models, and/or any other suitable algorithm.

The one or more classifiers can function to detect one or more food parameter values in a measurement (e.g., image). The classifiers can include: neural networks (e.g., CNN, DNN, region proposal networks, single shot multibox detector, YOLO, RefineDet, Retina-Net, deformable convolutional networks, etc.), cascade of neural networks, logistic regression, Naive Bayes, k-nearest neighbors, decision trees, support vector machines, random forests, gradient boosting, and/or any other suitable classifier.

The one or more object detectors can function to detect foodstuff in an image, detect cooking tools, cooking accessories, hands, humans, robots (e.g., robot inserts and removes food), and/or any other suitable object within an image. The object detector can include: neural networks (e.g., CNN, DNN, region proposal networks, single shot multibox detector, YOLO, RefineDet, Retina-Net, deformable convolutional networks, etc.), Viola-Jones object detection framework based on Haar features, scale-invariant feature transform (SIFT), histogram of oriented gradients (HOG) features, and/or any other suitable object detector.

The object detector is preferably a multiclass classifier trained to identify one or more food types (e.g., food classes), and can additionally or alternatively be trained to determine: an accessory state (e.g., full, half full, quarter full, empty), food count (e.g., identify a food count), food location (e.g., front, back, left, right, middle, etc.), a food or accessory trajectory (e.g., in or out), a food or accessory level (e.g., top, bottom, middle rack, etc.), and/or other food parameters. Alternatively, the system can include a different object detector for each: food parameter (e.g., one for food classes, another for food count), each food parameter value (e.g., one for chicken, another for pork), and/or any other suitable number of object detectors.

The one or more object tracking models can function to track objects, provide feedback to the camera system to dynamically shift the tilt of the camera to track the object, and/or perform any other functionality. The object tracking models can be used with the object detectors, the segmentation models, and/or the classifiers. The object tracking models can include motion models (e.g., for motion estimation), visual appearance models, be model free, or be otherwise constructed. The object tracking models can include neural networks (e.g., CNN, LSTM and CNN, DNN, etc.), kernel-based methods, contour-based methods, object detection methods, optical flow, and/or other models. The object tracking model can be: a detection based tracker, a detection free tracker, a single object tracker, a multi-object tracker, an offline tracker, an online tracker, leverage an online or offline learning strategy, and/or use other strategies. The object tracking can be performed using Euclidean distance with reference to the previous frame, the previous n-frames, using mean IOU and/or linear sum assignment, and/or otherwise performed.

The one or more segmentation models can function to segment foreground objects (e.g., food, accessories, etc.) from the background (e.g., appliance interior, accessories, etc.). The segmentation model can be used with the classifier (e.g., to segment an image based on one or more food parameters), the object detector (e.g., to segment an image based on the detected object), and/or used with any other suitable algorithm or not used with other algorithms. The segmentation model can be a semantic segmentation model, an instance-based segmentation model, and/or any other suitable segmentation model. The segmentation model can be k-nearest neighbor clustering algorithms, gradient-based algorithms, and/or any other suitable algorithm.

The system can optionally be used with cooking tools or accessories, such as a shovel, rack, pan, tray, pot, and/or other instruments.

The system can be used with: trigger events (e.g., sensor triggers, such as from motion sensors, door open/dose sensors, etc.; cavity light changes; sampling schedule satisfaction; etc.), such as start trigger events, stop trigger events, etc.; measurements; measurement features; regions of interest; food parameters; cooking instructions; but can additionally or alternatively be used with any other suitable elements.

The measurements can be used to monitor the cavity of the appliance, used for classification (e.g., determining measurement information sampled by sensors on-board the appliance), and/or otherwise used.

The measurement features can be: measurement quality (e.g., image quality), location of food in an image, visible area of food in an image (e.g., food can be occluded by the appliance, by cooking tools, etc.), and/or any other suitable feature.

The food parameters can be determined using computer vision (e.g., using one or more of the previously described modules) and/or the food parameters can be the direct measurements. Each food parameter can be associated with a confidence level (e.g., score, probability, etc.). Each food parameter value (or combination thereof) can be associated with one or more cooking instructions. For example, each food type (and/or food type-rack height combination) can have a different set of cooking instructions.

However, the system can additionally or alternatively include any other suitable elements and/or components.

5. Method

Figure 5:
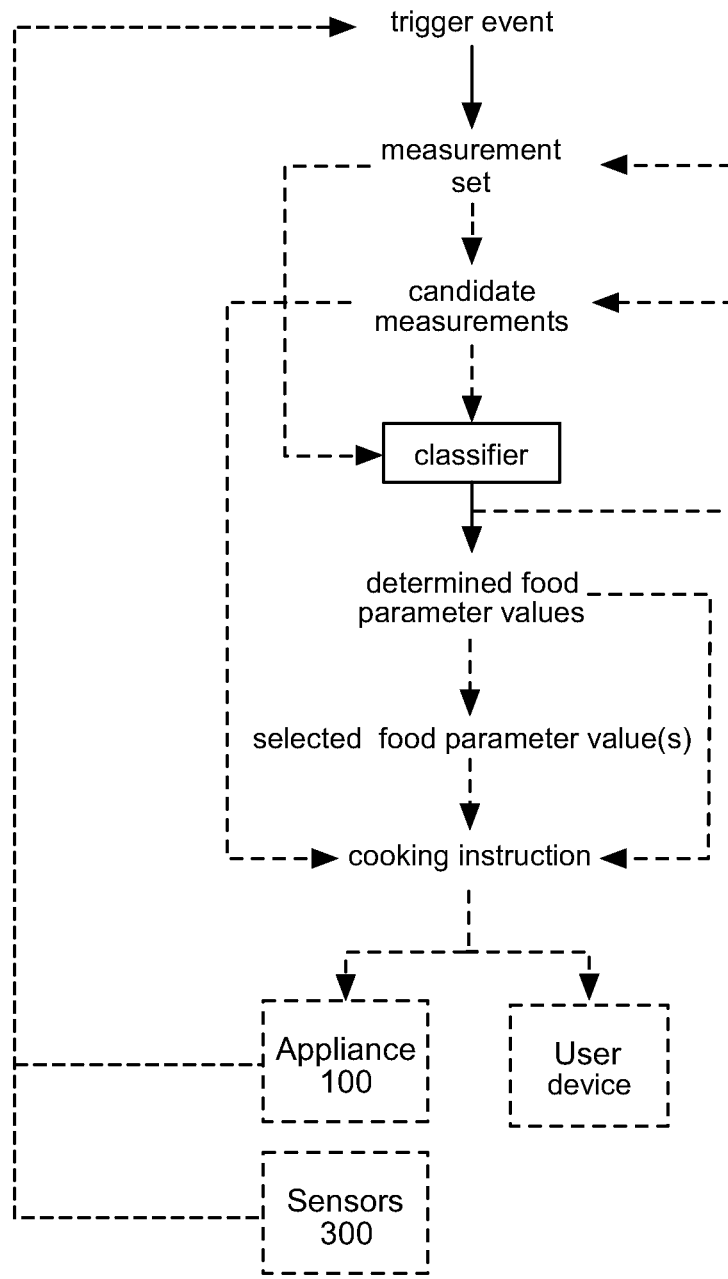
FIG. 5 is a schematic representation of an embodiment of the method and system.

The method can include (e.g., as shown in FIG. 5): detecting a trigger event S100; sampling a measurement set S200; optionally determining candidate measurements for subsequent analysis based on the measurement set S300; optionally determining a set of food parameter values from the measurements S400; optionally selecting a food parameter value for use S500; determining a cooking instruction based on the food parameter value S600; automatically operating the appliance based on the cooking instructions S700; optionally determining a foodstuff trajectory relative to the cook cavity S800; optionally training one or more modules S900; and/or any other suitable elements.

The method preferably functions to automatically determine a new cooking instruction for a particular identified foodstuff. The method can additionally or alternatively function to update and/or start a new cooking instruction after a start trigger event associated with a food removal event (e.g., based on the food parameters and respective foodstuff locations still within the cooking cavity), and/or perform any other suitable functionality. In a first example, the cooking instruction can be an appliance action (e.g., to cook the food according to the cook instruction, start a fan to cool the cavity, etc.). In a second example, the cooking instruction can be an instruction for cooking the remaining food items within the cavity.

In variants, the method includes storing the measurement set (e.g., series of measurements, measurement stream, etc.) in S200 in a buffer and performing S300 and/or S400 iteratively on the measurement stream by retrieving measurements from the buffer. Additionally or alternatively, the method includes iteratively repeating S200-S400 on successive measurements in the measurement stream.

The method can be performed each time a trigger event is detected, periodically, and/or at any other suitable time. The method can be entirely or partially performed locally or remotely. The method is preferably performed using the system discussed above, but can alternatively use another system.

5.1 Detecting a Trigger Event S100.

Detecting a trigger event S100 functions to determine when to start sampling measurements in S200, determine when to stop sampling measurements, and/or any other functionality. Detecting the start trigger event is preferably performed by the appliance, a remote processing system (e.g., based on the externally mounted sensor data), and/or by any other suitable system. The start trigger event is preferably detected based on a signal from one or more sensors of the sensor suite, but can additionally or alternatively be detected based on a post-processing of a signal, and/or otherwise detected. Detecting the start trigger event can include detecting a trigger event in a signal sampled on a sampling schedule to detect a state change.

In a first variation, the trigger event is a state change event at the appliance (e.g., door or lid open or dose, such as using a door or lid sensor; weight change, such as using a weight sensor, etc.).

In a second variation, the trigger event can be motion detected in the environment surrounding the appliance (e.g., using a sensor integrated into the appliance and/or an external sensor).

In a third variation, the trigger event can include detecting a predetermined object within an image frame (e.g., new food, new cooking accessory, etc.) using one or more of the machine learning processes previously described.

In a fourth variation, the trigger event can be an ambient environment change (e.g., human movement, change detection in the sampled frames, etc.).

In a fifth variation, the trigger event can be a receipt of a remote trigger (e.g., sent by user device).

However, the trigger event can be otherwise detected.

5.2 Sampling a Measurement Set S200.

Sampling a measurement set S200 functions to sample measurements for subsequent food characterization. The measurements can be sampled in response to detection of the start trigger event, sampled in response to detected motion in the field of view of the camera system, and/or sampled at any other suitable time. The measurements can be sampled until a stop trigger event (e.g., door close event, stop condition satisfaction, etc.) is determined. The measurements can be: images (e.g., still images, an image time-series, video frames, etc.), videos, audio, vibration, weight, light, temperature, distance, acceleration, and/or any other suitable measurement.

The measurements can include: images (e.g., RGB, RGB-D, greyscale, temperature, etc.); videos, audio, vibration, weight changes, light changes, temperature, any other values (discrete or continuous), and/or any other suitable measurement.

The measurements are preferably sampled by the sensors of the sensor suite, more preferably the sensors on-board the appliance (e.g., camera system, accelerometer, etc.), but can alternatively be sampled by a separate device. The sensors can optionally be dynamically controlled during sampling to improve measurement quality. For example, when the measurement set includes images, the camera exposure, such as exposure bracketing (e.g., synthesize an image with higher dynamic range), white balance, brightness, focus, blur, and/or other camera parameters can be adjusted to improve image quality.

The measurement set can be sampled at a predetermined sampling rate (e.g., every 30 milliseconds, every 40 milliseconds, every 300 milliseconds, every 400 milliseconds, etc.), processing rate (e.g., of a pre-processor, of a parameter value determination module), at maximum sampling rate, and/or at any other suitable rate.

The measurement set can include: measurements sampled during an analysis session (e.g., between the first and second trigger event), measurements sampled for a predetermined time duration, measurements sampled while the food parameter value confidence is less than a threshold, while food is in the field of view (FOV) and/or region-of-interest, and/or the measurement stream can be measurements sampled at any other suitable time.

Sampling the measurement set can include storing the measurements in a buffer for later processing. Each measurement can be stored with an associated time-step (e.g., sample time), sensor identifier, sensor location, and/or any other suitable information. Additionally or alternatively, the measurement set is processed directly by S300 and/or S400 (e.g., the measurement set is not stored), such as in real- or near-real time.

However, the measurement set can be otherwise sampled.

5.3 Determining Candidate Measurements S300.

Determining candidate measurements S300 functions to determine candidate measurements for food parameter determination in S400. The candidate measurements can be determined (e.g., selected, generated, inferred, etc.) from the measurement set, from prior measurement sets, and/or from other measurements. Determining candidate measurements for subsequent analysis can be performed at or slower than the sampling rate, faster than or at the processing rate, and/or at any other suitable frequency. The frequency at which measurements are determined can be: continuous, for X selected measurements from every Y sampled measurements, batched at the end of an analysis session, and/or at any other suitable frequency. One or more candidate measurements can be determined from each measurement set (e.g., for each method instance). S400 can be performed: for each frame, after a predetermined number of images have been sampled, after food encompasses a predetermined proportion of the image or frame, after a predetermined amount of food has passed the sensor system, after a predetermined period of time after the trigger event, and/or at any other suitable time.

In a first variant, determining candidate measurements can include selecting measurements from the measurement set sampled in S200. Measurements can be selected based on selection criteria, heuristics, and/or otherwise selected. The selection criteria can include: foodstuff presence; accessory and/or cook tool presence; foodstuff presence within a region of interest; predetermined amount of foodstuff presence within a measurement relative to a measurement (e.g., more than 30% of the image includes foodstuff, more than 40% more than 50%, more than 60%, more than 70%, more than 80%, more than 90%, between 40%-60%, between 50%-70%, between 60%-80%, between 70%-100%, etc.); proportion of the accessory already inserted (e.g., already seen by the camera system for the measurement instance, as determined based on the image stream, the estimated accessory velocity, the frame depicting the accessory's leading edge, the estimated accessory size, etc.); measurement (image) clarity score (e.g., blurriness less than predetermined threshold, least blurry, etc.); measurements where the food is least obscured (e.g., by a hand, mitten, cooking tool, cooking accessory, the appliance, etc.); and/or any other measurement criteria.

The region of interest can be relative to an insertion path into and/or out of the cook cavity of the appliance; relative to the image; relative to the appliance door; and/or otherwise defined. The region of interest is preferably static relative to the camera system's field of view, the appliance, or the cook cavity, but can alternatively be mobile or dynamically determined. The region of interest can: encompass a portion of the camera system's FOV, encompass the entirety of the camera system's FOV, be the same size as, smaller, or larger than the camera system's FOV, be centered on the camera system's FOV, be offset from the camera system's FOV (e.g., to the left, right, exterior, or interior, etc.), be a region defined relative to the appliance (e.g., encompass the center of the cook cavity threshold and/or doorframe), and/or be otherwise arranged. The region of interest is preferably a 2D region, but can alternatively be a 3D region. In a first example, the region of interest can be the center of the insertion path into and/or out of the appliance. In a second example, the region of interest can be a predetermined region within the camera system field-of-view (e.g., center of an image, front half of the image, back half of the image, left side of the image, right side of the image, etc.). In a third example, the region of interest can be defined as a detected cooking accessory or cooking tool within an image. However, the region of interest can be otherwise defined.

In a first embodiment, the measurements can be selected using a search technique to identify a candidate measurement set and/or select a best measurement from the candidate measurement set. The search techniques can include: using motion detection to detect motion in the measurements, using an object detector neural network, using a fiducial and identifying the fiducial in the measurement, and/or any other suitable search technique. The best measurement can be selected from the candidate measurement set based on confidence scores (e.g., the measurement with the highest confidence score, a confidence score above a predetermined threshold, etc.), the measurement with a fiducial in a predetermined position, the measurement that depicts the foodstuff centered within the region of interest, selected randomly from the candidate measurement set, and/or otherwise selected from the candidate measurement set or from the measurement set (from S100).

In a first example, measurements can be selected when the measurements depict motion. Measurements can be excluded from the candidate measurement set when the measurements do not depict motion (e.g., static measurements). Motion detection can be used to determine a single time-step or range of time-steps associated with one or more best measurements (e.g., determined based on the selection criteria). In a specific example, the range of time-steps can be determined at a start time-step for a first measurement that depicts motion and an end time-step can be a last measurement that depicts motion (e.g., a prior measurement one time-step before a next measurement that does not depict motion). In a second specific example, the best measurement can be the measurement captured at the midpoint of the range. However, motion detection can be otherwise used to select candidate measurements.

In a second example, an object detector can be trained to identify the presence and/or location of foodstuff relative to a region of interest in a measurement. In a specific example, when the foodstuff is identified as within the region of interest, the measurement can be added to the candidate measurement set and/or selected as the best measurement.

In a third example, an accessory can be marked with a fiducial and the fiducial can be tracked across measurements (e.g., images, frames, etc.) using optical flow. The candidate measurement set can be selected based on whether the fiducial is located within a predetermined measurement region (e.g., region of interest, an edge of the measurement, a corner of a measurement, etc.). A best candidate measurement can be selected from the candidate measurement set when the fiducial is centered in the predetermined measurement region, along an edge of the predetermined measurement region, and/or otherwise located in the predetermined measurement region. In a specific example, the fiducial can be marked on a pan (e.g., pan in FIG. 4), wherein the pan can include foodstuff or be empty.

Figure 7:
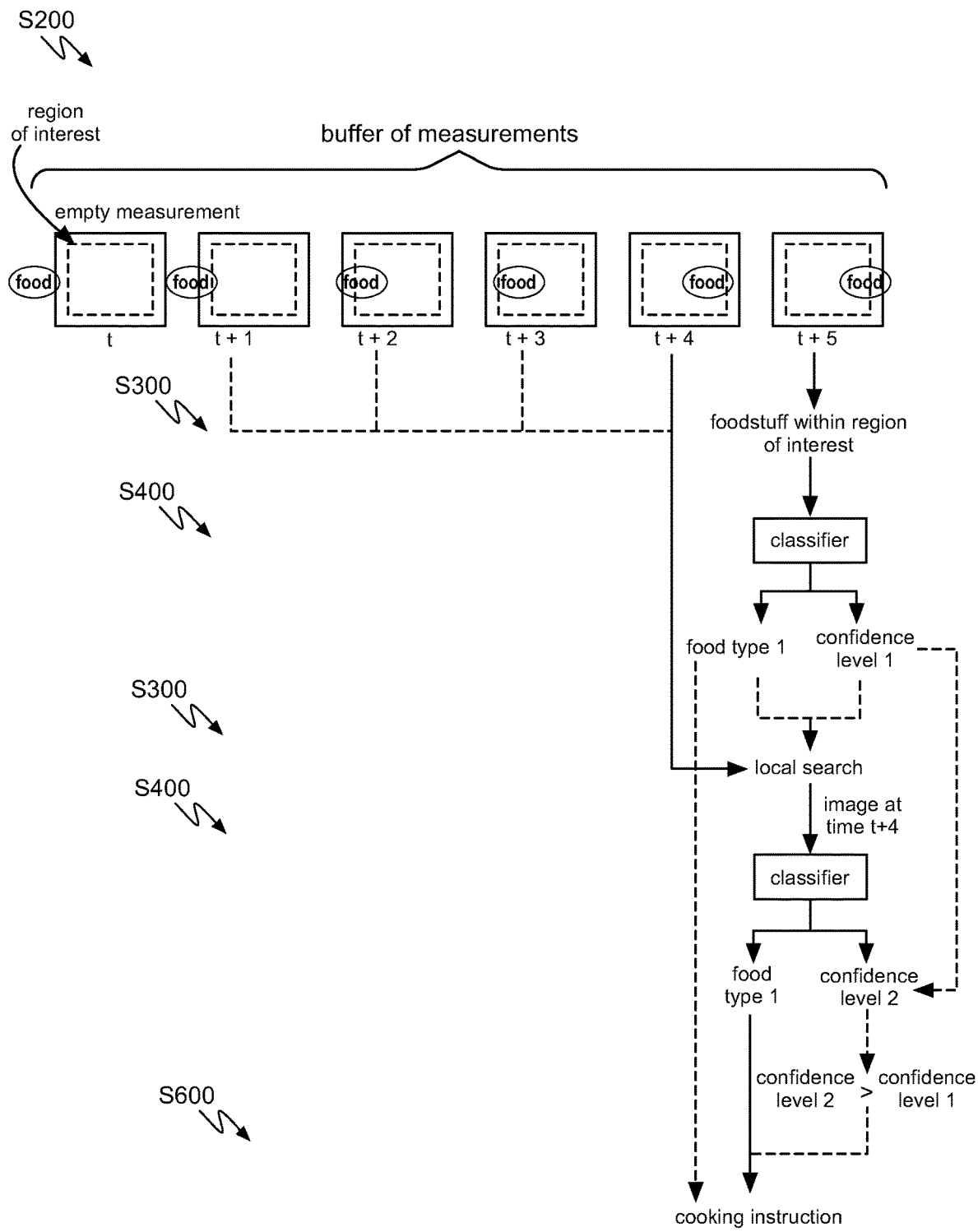

In a fourth example, the measurements can be added to the candidate measurement set by performing a search using measurements stored in the buffer and/or of the measurement stream to determine one or more measurements wherein the foodstuff is within the region of interest. In a first variation, the search can be performed across multiple image resolutions. For example, food or change can be detected in low-resolution images, wherein higher-resolution images associated with the low-resolution images (e.g., concurrently captured, captured within a predetermined time window after the food or change detection image, etc.) can be selected as candidate measurements. However, multiple image resolutions can be otherwise used. In a second variation, the search can be performed based on time-steps associated with the measurements (e.g., within a predetermined window associated with the current time-step, which can include a previous time-step and/or a future time-step). For example, images sampled during a predetermined time window after trigger event occurrence (e.g., 10 ms after, 30 ms after is after, etc.; within a 1 s, 3 s, 10 s, 30 s, 1 min time window, etc.) can be selected as candidate measurements. In another example, images sampled during a time window encompassing the timestamp for an image in which foodstuff is detected (e.g., centered about the timestamp, offset from the timestamp, etc.) can be evaluated and/or selected as candidate measurements. The search can terminate based on an increase in confidence thresholds from a first measurement to a second measurement (e.g., the second measurement can be selected as the best measurement because of the higher confidence score), based on a foodstuff within the region of interest (e.g., the measurement associated with the foodstuff centered in the region of interest can be selected as the best measurement), and/or any other suitable termination condition. An example is depicted in FIG. 7. In this example, the best measurement is obtained at time t+4 because the food is most centered within the region of interest.

In a fifth example, the candidate measurements can be selected based on a score. The score can represent clarity of an image, object of interest proportion in an image, measurement noise, frame motion, the proportion of the accessory already passed through the camera system's FOV, and/or other measurement metrics. The score can be determined using one or more of the modules described above, using an equation and/or any other suitable technique. The measurement subset can be selected based on the measurements associated with the highest score, the measurements associated with scores above a predetermined threshold, and/or otherwise selected.

However, the measurements can be otherwise selected.

In a second variation, determining candidate measurements can include synthesizing one or more measurements (e.g., from the measurement set). Synthesizing one or more measurements can include stitching multiple images and/or image segments together (e.g., to create a synthetic measurement). Measurements from the measurement set that are stitched together can be: contiguous, noncontiguous (e.g., separated by one or more intervening frames), depict overlapping food, accessory, or other features, and/or be otherwise related. The measurements can be stitched together using: photogrammetric techniques, direct alignment, feature-based registration (e.g., geometric registration, keypoint registration, etc.), global registration (e.g., using a bundle adjustment, etc.), and/or other methods. In a first example, synthesizing multiple images can generate a synthetic image of a pan (e.g., including the food theron). Synthesizing multiple measurements can additionally or alternatively include de-blurring, de-warping, and/or otherwise pre-processing the synthesized measurements.

In a third variation, determining candidate measurements can include processing the measurements of the measurement set through a quality-control system that determines a binary response to add or not add the processed measurement to the set of candidate measurements. The quality-control system can be one or more trained neural networks, heuristics, a clustering algorithm, and/or any other suitable algorithm. The quality-control system can be trained to reject measurements depicting hands, measurements with a blurriness level above a threshold (e.g., 30%, 40%, 50%, 60% etc.), measurements that don't depict foodstuff, and/or any other suitable task for outlier rejection. In a first example, the quality control system can have a separate trained neural network to reject images based on hand detection, foodstuff detection, and blurriness. In a second example, the same network can be trained to reject measurements based on hand detection, foodstuff detection, and blurriness. However, the quality-control system can be otherwise defined.

However, the candidate measurements can be otherwise selected.

5.4 Determining a Set of Food Parameter Values S400.

Determining a set of food parameter values S400 can function to characterize the foodstuff inserted into and/or removed from the appliance. The food parameter values can include: food type (e.g., food class), count, quantity, volume, distribution, cavity location (e.g., rack position, left or right, front or back, etc.), initial appearance (e.g., color, color distribution, etc.), temperature, trajectory (e.g., into the cook cavity, out of the cook cavity, etc.), and/or any other suitable parameter value.

Determining food parameter values can be performed at a frequency equal to or slower than in S300, S200, at the slowest sensor sampling rate, and/or at any other suitable frequency. The food parameter values can be determined based on the candidate measurements from S300, the measurement set from S200, and/or any other suitable information. The set of food parameter values can include: a single food parameter value determined for a single candidate measurement, multiple food parameter values (e.g., all or a subset thereof of the measurements from S200 and/or S300), and/or any other suitable number of measurements. The food parameter values can be determined within a predetermined time after detection of the start trigger event (e.g., less than 100 ms, less than 200 ms, less than 300 ms, less than 500 ms, less than 1 second, less than 2 seconds, less than 3 seconds, less than 4 seconds, less than 5 seconds, more than 5 seconds, within 1-5 seconds, within 2-4 seconds, within 100-300 ms, within 150-250 ms, etc.), and/or at any other suitable time. The food parameter values can be determined based on: the candidate measurements from S300, the measurement set from S200, the current measurements, reference measurements, and/or any other suitable set of measurements.

In a first variation, the food parameter values can be determined using one or more classifiers. The one or more classifiers can receive as input: the candidate measurements from S300, the measurement set from S200, and/or any other suitable input. The one or more classifiers can include: neural networks (e.g., DNN, CNN, RNN, feed forward neural network, etc.), regressions, cascade of neural networks, clustering algorithms, decision trees, support vector machines (SVMs), heuristics, and/or any other suitable classifier. The one or more classifiers can be the same (e.g., the same architecture, the same architecture with the same parameters, etc.) or different architectures (e.g., different classifier architectures, the same classifier architecture with different parameters, etc.).

In a first embodiment, multiple food parameter values can be determined using a single classifier. For example, the classifier can determine the probability (and optionally, associated confidence level) that the food includes chicken or pork; 1, 2, 3, 4, 5, or 6 pieces; the probability that the food is being inserted and/or removed.

In a second embodiment, each food parameter value is determined using a separate classifier. The multiple classifiers can have the same inputs and/or different inputs (e.g., measurements such as images, image metadata, any other metadata, etc.). In a first example, each classifier can be a different classifier (e.g., trained to determine different food parameters). In a second example, each classifier can be a different instance of the same classifier (e.g., to process inputs in parallel).

In a third embodiment, the food parameter values are determined using one or more classifiers, such as using one or more trained neural networks (e.g., trained to classify the food parameter values).

In a fourth embodiment, the food parameter values are determined using a set of heuristics. For example, S400 can determine the food location by comparing the food class of the visible food within the cavity (e.g., determined from an image of the food resting within the cavity) with the previously-detected set of food classes (e.g., from the same method instance). The missing food classes can be inferred as located within a region outside of the camera system's FOV (e.g., in an obscured region, in an unmonitored region, etc.). In illustrative examples, the missing food classes can be classified as located on the lower rack when the appliance is an oven, and can be classified as located on a back upper rack when the appliance is a grill.

In a second example, S400 can determine whether the food is the same food instance as that previously inserted or removed based on heuristics. In an illustrative example, the food can be inferred to be the same when the food was previously inserted (e.g., the trajectory determined during the prior method instance was toward the cook cavity) and there was no intervening door opening event (and/or no food was detected in the region of interest after an intervening door opening event). In a second illustrative example, the food can be inferred to be the same when the food was previously removed (e.g., the trajectory determined during the prior method instance was away from the cook cavity) and the currently-detected food appearance is substantially similar (e.g., by a distance measurement, by a similarity score, etc.) to the food's appearance sampled during the prior method instance (e.g., during food removal), the food is reinserted within a predetermined period of time, the inserted food's temperature is within a predetermined temperature range of the removed food's temperature, and/or other heuristics are met.

However, the food parameter values can be otherwise determined.

In this variation, one or more measurements or features extracted from the measurements are fed into the trained neural network, which outputs one or more food parameter values or confidence scores for the set of potential food parameter values. The measurements can be concatenated and fed as input into a single channel of the classifier; fed as separate inputs into parallel channels (e.g., wherein channel-channel relationships are hardcoded in algorithm); or otherwise provided to the classifier.

In a second variation, the food parameter values can be directly measured. For example, the food temperature can be measured using an IR camera and/or temperature probe. In a second example, the food distance (e.g., from the camera) can be measured using a depth sensor (e.g., time of flight sensor, projected light, structured light, LiDAR, stereo camera, etc.) or computer vision techniques (e.g., optical flow).

In a third variation, the food parameter value can be calculated, selected from a lookup table, determined using heuristics or rules, or otherwise determined. For example, the food distance can be estimated from an image based on the apparent size of a known fiducial (e.g., on a cooking accessory, etc.) moving with the food within the frame. In a second example, the rack position can be estimated based on the food distance (e.g., the food identifier is assigned to a given rack when the food height estimate falls within a range associated with the rack).

In a fourth variation, the food parameter values can be generated by a 3D model (e.g., from depth map, from images, etc.) and the 3D model can be analyzed to extract the food parameter values.

However, the set of food parameter values can be otherwise determined.

5.5 Selecting a Food Parameter Value for Use S500.

Optionally selecting one or more food parameter values for use S500 functions to support higher confidence of food parameter values. Alternatively, all of the food parameter values determined in S400 can be used in subsequent processes. The food parameter values can be selected after a predetermined number of food parameter values are determined for the analysis session, continuously until a stop condition is met (e.g., a second trigger event, predetermined threshold of time, etc.), and/or at any other suitable time. Selecting a food parameter value can include selecting a single food parameter value, multiple food parameter values, and/or any other suitable number of food parameter values. In a first example, multiple food parameter values can be selected: a food type for the foodstuff, the count of foodstuff, the location of the foodstuff within the appliance, and/or any other suitable parameter value for the particular food type. In a second example, a single food parameter value is selected, such as the foodstuff type.

The stop condition can include: M of N agreements of (consecutive or nonconsecutive) food parameter values; a percentage of food parameter value votes exceeding a predetermined threshold (e.g., more than 50%, more than 70%, more than 90%, more than 95%, between 80%-100%, between 90-100%, etc.); a predetermined number of consecutive food parameter value agreements; satisfaction of a confidence threshold associated with a food parameter; a second trigger event detection; a predetermined amount of time is met; a predetermined number of measurements have been processed; a predetermined number of values have been determined for a given food parameter; and/or any other suitable stop condition.

The selected food parameter value can be: the food parameter value with the highest number of votes derived from different measurements, the food parameter value having a threshold number of votes derived from different measurements or different models, the value with the highest confidence level, the value with a confidence level that meets a predetermined threshold, a food parameter value matching a user-confirmed value, and/or otherwise selected.

Selecting the food parameter value can include performing multiple food parameter value recognitions (e.g., of the same food parameter) to support higher confidence; optionally receiving user confirmation of food parameter values (e.g., food type, food placement, food quantity, food count, etc.); and/or any other suitable elements.

The food parameter value can be selected within a predetermined time after detection of the start trigger event (e.g., less than 50 ms, less than 100 ms, less than 200 ms, less than 300 ms, less than 500 ms, less than 1 second, less than 2 seconds, less than 3 seconds, less than 4 seconds, less than 5 seconds, more than 5 seconds, within 1-5 seconds, within 2-4 seconds, within 100-300 ms, within 150-250 ms, etc.), and/or at any other suitable time.

However, the food parameter values can be otherwise selected for use.

5.6 Determining a Cooking Instruction S600.

Determining cooking instruction S600 functions to automatically select a cook program based on an identified food type, automatically tailor a cook program based on the identified food parameter values, automatically determine a cook time (e.g., estimated time to completion), and/or perform any other suitable functionality. The cooking instructions can be determined based on: the food parameter values, the selected food parameter set, the measurement set, the movement direction, predetermined cook programs associated with the food parameter values, and/or any other suitable information. Determining a cooking instruction can include determining a single cooking instruction, multiple cooking instructions (e.g., for cooking the foodstuff and otherwise operating the appliance, etc.), and/or any other suitable number of cooking instructions. The cooking instruction can be determined within a predetermined time after detection of the start trigger event (e.g., less than 100 ms, less than 200 ms, less than 300 ms, less than 500 ms, less than 1 second, less than 2 seconds, less than 3 seconds, less than 4 seconds, less than 5 seconds, more than 5 seconds, within 1-5 seconds, within 2-4 seconds, within 100-300 ms, etc.), and/or at any other suitable time. The cooking instructions can be: selected (e.g., from a library, a lookup table, etc.), received (e.g., from a user, from a remote system), dynamically determined (e.g., calculated, constructed from different instruction values for different food parameters, etc.), and/or otherwise determined.

In a first variation, determining cooking instructions can include retrieving cook programs based on the determined food type. In a second variation, determining cooking instructions can include merging the respective cook programs of multiple detected food types into a single cook program. A merged cook program can include instructions to: operate individual heating elements based on physical food location (e.g., rack level, right or left, etc.); adjusting cook time based on initial appearance or temperature of the foodstuff; adjusting cook time or temperature based on food count and/or volume; averaging and/or otherwise adjusting temperature and/or duration settings based on food type composition (e.g., of multiple foods); selecting lowest instructed temperature as the cook program; and/or otherwise merging cook programs. Cook programs can be merged as discussed in U.S. application Ser. No. 17/311,663, filed 18 Dec. 2020, which is incorporated herein in its entirety by this reference, or otherwise merged.

Figure 8:
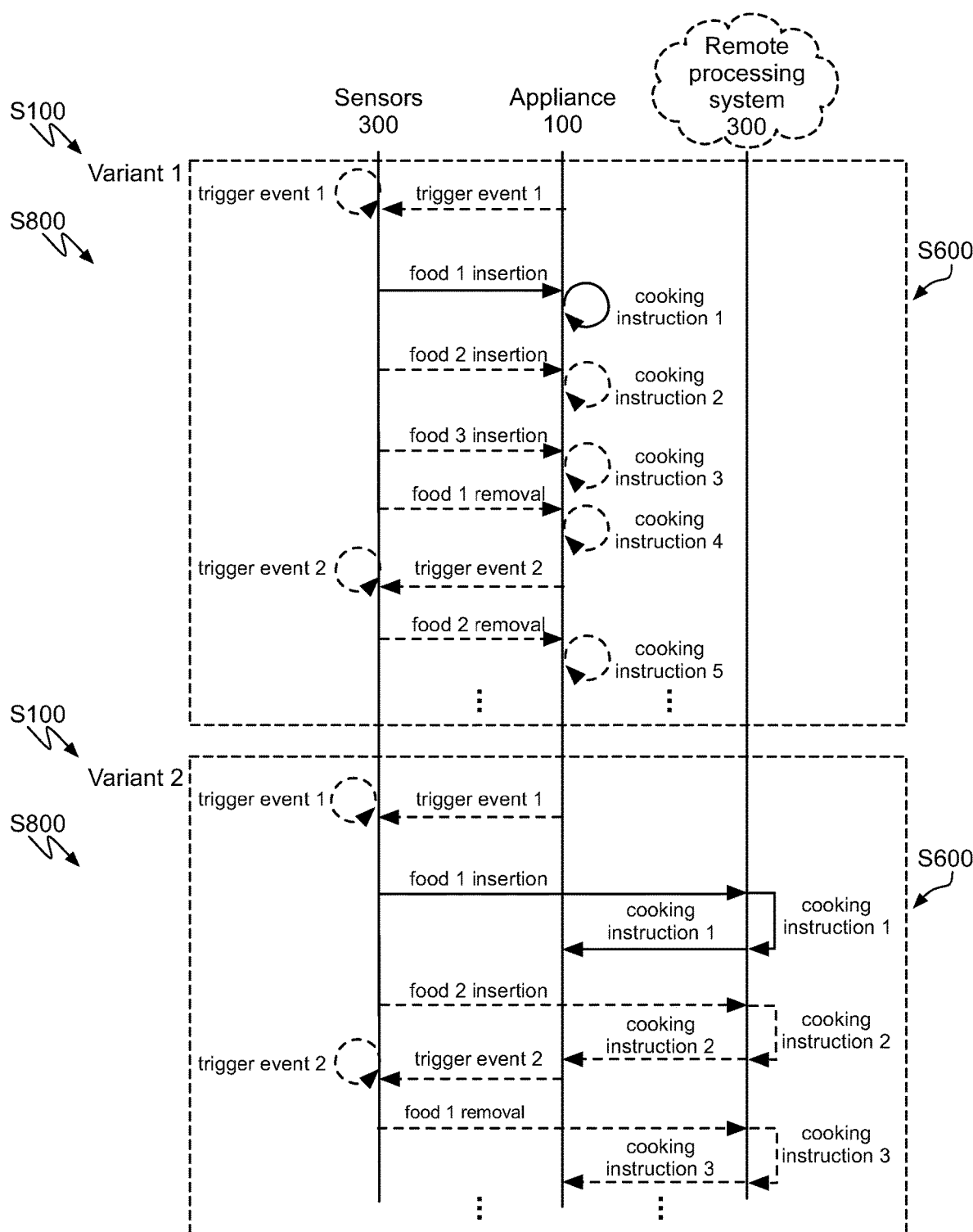
FIG. 8 depicts variants of the method.

In a second variation, determining cooking instructions can include: in response to detection of a food removal event (e.g., wherein the food can be classified as it is removed from the cooking cavity), updating the cook program based on the foods and respective food counts and/or food quantities still within the appliance (e.g., remaining within the appliance). A buffer can be used to store prior food parameter values associated with prior insertion events and the buffer can be updated after a food removal event (e.g., update the food parameter values based on the food parameter values associated with the foodstuff removed from the cavity). The updated buffer can be used to determine an updated cook program. An example is depicted in FIG. 8. An example of a food removal event includes determining a food trajectory exiting the cooking cavity with no reinsertion within a predetermined duration thereafter.

However, the cooking instructions can be otherwise determined.

5.7 Automatically Operating the Appliance Based on the Cooking Instructions S700.

Automatically operating the appliance based on the cooking instructions S700 functions to automatically cook the foodstuff, notify a user (e.g., send a notification to a user device) to remove the foodstuff from the appliance after cook instruction completion, and/or perform any other suitable functionality. When a user action is food insertion (e.g., determined by S800), automatically operating the appliance can include selecting a new cooking instruction (e.g., for the identified food when the appliance is empty; etc.), and/or updating the cooking instruction based on other foods already in the appliance. An example is depicted in FIG. 8. When a user action is food removal (e.g., determined by S900), automatically operating the appliance can include: ceasing cook cavity operation (e.g., ceasing heating element operation, turning off the heating elements, etc.); pausing the cook program; maintaining the last cavity temperature; and/or otherwise adjusting the cooking instructions.

In a first variant, automatically operating the appliance does not include a human in the loop until the cook instruction completes. When the cook instruction completes, the user can be notified to remove the foodstuff from the cook cavity. However, the method can include a human in the loop.

However, the appliance can be otherwise automatically operated.

5.8 Determining Foodstuff Trajectory Relative to the Cooking Cavity S800.

Determining foodstuff trajectory relative to the cooking cavity S800 can function to determine a user action associated with the appliance (e.g., insertion event, removal event, etc.), determine a foodstuff future state (e.g., inserted into the cooking cavity, removed from the cooking cavity, etc.), identify foodstuff that has been removed from the cooking cavity and/or perform any other suitable functionality. The foodstuff trajectory can be relative to the cook cavity, relative to the cavity threshold, relative to the appliance, relative to the camera system, relative to the image, and/or relative to any other reference source. The foodstuff trajectory can be an insertion (e.g., forward, inward toward the cook cavity) trajectory, a removal (e.g., backward, outward from the cook cavity) trajectory, a left or right trajectory, and/or any other suitable trajectory.

The foodstuff trajectory can be used to determine cook instructions in S600, or otherwise used. In a first example, when the food trajectory is an insertion trajectory (e.g., insertion event), S600 can determine whether there is currently foodstuff present in the cavity and determine a new cook instruction when the cavity is empty, or update the cook instruction when food is present in the cavity. In a second example, when the food trajectory is a removal trajectory (e.g., removal event), S600 can determine whether there is currently foodstuff present in the cavity and determine an updated cook instruction when there is foodstuff present or determine a new cook instruction when the cavity is empty (e.g., turn on a cooling fan, turn off the appliance, etc.).

The foodstuff trajectory can be determined based on the measurement set from S200, the candidate measurements from S300, be received from a user, and/or be otherwise determined.

In a first variant, determining foodstuff trajectory can include using optical flow techniques to determine the direction of food motion.

In a second variant, determining foodstuff trajectory can include using temperature measurements (e.g., from an infrared camera, a temperature sensor, etc.) to determine food temperature, wherein the future foodstuff state can be inferred from the food temperature; and/or any other suitable technique. For example, identification of hot food can indicate a food removal action and identification of cool food can indicate a food insertion action.

In a third variant, determining foodstuff trajectory can include using a recurrent neural network trained on a sequence of measurements that are labelled with a particular trajectory. The recurrent neural network can include long-short-term-memory units, gated-recurrent units, and/or any other suitable components.

However, foodstuff trajectory can be otherwise determined.

5.9 Training the One or More Modules S900.

Training the one or more modules S900 functions to determine model parameters for the modules previously described. Training the one or more modules can be performed using training data, which can include: real measurements (e.g., images from the camera system), synthetic measurements, (e.g., generated images from a generative neural network, manipulating real images, etc.), depth information (e.g., from depth sensor, generated from stereo camera pair or any other 2 or more cameras).

In a first variation, the training data can include images and/or video of moving foodstuff wherein the images and/or video are labelled with a one or more of food type, physical food location, distance from the camera system, foodstuff trajectory, and/or any other information.

In variants, training the one or more modules can include using transfer learning techniques, using few shot and/or single shot training techniques, multi-shot learning techniques, and/or any other suitable learning techniques.

However, the one or more modules can be otherwise trained.

Different processes and/or elements discussed above can be performed and controlled by the same or different entities. In the latter variants, different subsystems can communicate via: APIs (e.g., using API requests and responses, API keys, etc.), requests, and/or other communication channels.

An alternative embodiment implements the above methods and/or processing modules in a computer-readable medium storing computer-readable instructions. The instructions are preferably executed by computer-executable components integrated with the system. The computer-readable medium may be stored on any suitable computer readable media such as RAMs, ROMs, flash memory, EEPROMs, optical devices (CD or DVD), hard drives, floppy drives, non-transitory computer readable media, or any suitable device. The computer-executable component is preferably a processor but the instructions may alternatively or additionally be executed by any suitable dedicated hardware device. The system can additionally include one or more computing systems, which can include one or more physical processors (e.g., CPU, GPU, microprocessors, ASICs, etc.) and/or other computer-executable component or hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A system, comprising:
an appliance comprising a cook cavity and a camera system mounted above the cook cavity; and
a processing system, configured to:
detect a start trigger event at the appliance;
receive a series of measurements from the camera system, wherein measurements within the series of measurements are determined after the start trigger;
for each measurement in the series of measurements, determine a foodstuff score associated with a visibility of a foodstuff within the respective measurement, thereby producing a set of foodstuff scores;
select a candidate measurement set from the series of measurements based on the set of foodstuff scores;
calculate a food parameter value using the candidate measurement set;
determine a foodstuff translation trajectory relative to the cook cavity using the series of measurements;
determine a cooking instruction based on the foodstuff translation trajectory and the food parameter value; and
automatically operate the appliance based on the cooking instruction.

2. The system of claim 1, wherein the series of measurements comprises a series of images sampled by the camera system.

3. The system of claim 2, wherein the camera system comprises a stereo camera.

4. The system of claim 2, wherein the camera system is mounted to a top surface of the appliance, and is angled outward relative to the cook cavity.

5. The system of claim 1, wherein the food parameter value is a foodstuff identification determined using a trained neural network.

6. The system of claim 1, wherein:
the series of measurements comprises a series of images;
determining the foodstuff score comprises calculating a proportion of the respective measurement encompassed by the foodstuff; and
selecting the candidate measurement set comprises selecting a subset of images from the series of images based on the foodstuff score exceeding a predetermined proportion of each images of the subset.

7. The system of claim 1, wherein selecting the candidate measurement set comprises using motion detection to identify a measurement of the series of measurements that depicts a foodstuff within a region of interest, and when the measurement is identified, using the measurement to calculate the food parameter value.

8. The system of claim 1, wherein the food parameter value is determined based on M of N agreements of food parameter values.

9. The system of claim 1, wherein the processing system is additionally configured to, for an image in the series of measurements, determine an optical flow field based on the image and a prior image in the series of measurements, and wherein determining a foodstuff translation trajectory relative to the cook cavity using the series of measurements comprises using the optical flow field.

* * * * *